United States Patent [19]

Wolf et al.

[11] Patent Number: 4,528,254

[45] Date of Patent: * Jul. 9, 1985

[54] CONJUGATED POLYMER BATTERY CONTAINING ORGANOSULFUR SOLVENT

[75] Inventors: James F. Wolf, Dover; Suzanne M. Savner, Lake Hiawatha; MacRae Maxfield, North Plainfield; Lawrence W. Shacklette, Maplewood, all of N.J.

[73] Assignee: Allied Corporation, Morris Township, Morris County, N.J.

[*] Notice: The portion of the term of this patent subsequent to Sep. 18, 2001 has been disclaimed.

[21] Appl. No.: 556,717

[22] Filed: Nov. 30, 1983

[51] Int. Cl.$^3$ .................. H01M 6/14; H01M 4/60
[52] U.S. Cl. .................. 429/197; 429/194; 429/213
[58] Field of Search ............. 429/194, 197, 213

[56] References Cited

U.S. PATENT DOCUMENTS

| 3,544,385 | 12/1970 | Newman | 429/197 |
| 3,578,500 | 5/1971 | Maricle et al. | 429/194 X |
| 4,107,404 | 8/1978 | Horning et al. | 429/194 |
| 4,201,839 | 6/1980 | Johnson et al. | 429/194 |
| 4,321,114 | 3/1982 | MacDiarmid et al. | 204/2.1 |
| 4,416,960 | 11/1983 | Eustace et al. | 429/194 |

FOREIGN PATENT DOCUMENTS

| 58469 | 1/1982 | European Pat. Off. | |
| 76119 | 9/1982 | European Pat. Off. | |
| 2415883 | 9/1979 | France | 429/194 |

Primary Examiner—Brian E. Hearn
Assistant Examiner—Stephen J. Kalafut
Attorney, Agent, or Firm—Alan M. Doernberg; Richard C. Stewart, II

[57] ABSTRACT

Batteries wherein at least one of the anode and cathode is a conjugated backbone polymer and in which the electrolyte contains at least one sultone or sulfonate solvent. Preferred solvents such as propane sultone and butane sultone impart stability to the battery and permit the polymer, such as polyacetylene, to be highly oxidized or reduced without degradation.

19 Claims, No Drawings

CONJUGATED POLYMER BATTERY CONTAINING ORGANOSULFUR SOLVENT

DESCRIPTION

The present invention relates to batteries, and especially secondary batteries, containing at least one conjugated polymer electrode, and especially such batteries with an electrolyte containing an organosulfur solvent component which is a sultone or alkyl alkanesulfonate.

A variety of different batteries, and especially secondary batteries, have been described containing at least one electrode in which the active material is a conjugated polymer such as polyacetylene or polyphenylene. Exemplary disclosures of such batteries are U.S. Pat. No. 4,321,114 to MacDiarmid et al. (1981); European patent application 36,118 (corresponding to U.S. Ser. No. 220,496 now Pat. No. 4,442,187); European patent applications 58,469 and 76,119, both of Showa Denko K. K. Representative discussions of solvents for such batteries are contained on pages 8 and 9 of EPA 58,469, page 17 of EPA 76,119 and page 17 of EPA 36,118.

U.S. Ser. No. 408,376 of Shacklette and Elsenbaumer discloses sulfolane and methylsulfolanes as preferred solvents for such batteries. Depending upon various factors (e.g., the salt used) sulfolane has a stable cathodic range in contact with donor-doped (reduced) polyacetylene down to approximately 0.9 volts (relative to Li/Li$^+$), corresponding to about 7% doping $[Li_{0.07}(CH)^{-0.07}]_x$. Sulfolane also has good stability in contact with acceptor-doped (oxidized) polyacetylene having a potential range up to or exceeding 4 V relative to Li/Li$^+$. A constant search has been underway, however, for other solvents having various properties superior to sulfolane, and especially superior stability with respect to donor-doped conjugated polymers (e.g. lithium-doped polyacetylene), while still retaining oxidative stability.

BRIEF DESCRIPTION OF THE INVENTION

The present invention includes an improvement in a battery comprising an anode, a cathode and an electrolyte, wherein at least one of the anode and cathode comprises a conjugated backbone polymer and wherein the electrolyte comprises an organic solvent having dissolved therein a salt, with at least a portion of said salt inserted into said conjugated backbone polymer during the charging or discharging of said battery. In the improvement, the solvent comprises in total or in part at least one sultone of the formula

with R being unsubstituted alkylene of 2-5 carbons, forming with sulfur and oxygen a heterocyclic ring of 4-7 atoms, or said alkylene of 2-5 carbons substituted by one or more alkyl or alkoxy groups of 1-4 carbons; or said solvent is an alkyl alkanesulfonate of the formula R'O(SO$_2$)R" wherein R' and R" are each, independently, alkyl of 1-6 carbons.

DETAILED DESCRIPTION OF THE INVENTION

The major components of the battery of the present invention are the electrodes (anode (−) and cathode (+)), the electrolyte (salt in solvent or solvent mixture) and conventional or unconventional housing, charging mechanism, current collector and the like. The electrolyte, and especially the solvent or solvent mixture, will be described first.

Suitable sulfones for use in the electrolytes of the batteries of the present invention are those of the formula

wherein R is alkylene of 2-12 carbons, forming with sulfur and oxygen a heterocyclic ring of 4-7 carbons. The simplest sultones are those wherein R is (CH$_2$)$_n$ with n being an integer of 2-5: ethane sultone (n=2), propane sultone (n=3), butane sultone (n=4) and pentane sultone (n=5). Also suitable are alkyl-substituted or alkoxy-substituted sultones where R is branched alkylene such as 1-methyl-1,3-propylene, 1-methoxy-1,3-propylene, 2-methyl-1,3-propylene, 2-ethyl-1,4-butylene, 2,3-diethyl-1,4-butylene or 3,3-dimethyl propylene. Propane sultone (1,2-oxathiolane 2,2-dioxide) and butane sultone (1,2-oxathiane 2,2-dioxide) are espcially preferred.

Suitable alkyl alkanesulfonates are those of the formula

wherein R' and R" are each, independently, alkyl of 1-6 carbons. Examples include ethyl methane sulfonate (R'=ethyl; R"=methyl), propyl methane sulfonate, isopropyl methane sulfonate, or butyl butane sulfonate. While the lowest member of this series methyl methane sulfonate (R'=R"=methyl) may be used, it is not preferred because of its high reactivity as an alkylating agent (and suspected carcinogen). Preferred alkyl alkanesulfonates include ethyl methane sulfonate, butyl methane sulfonate and propyl ethane sulfonate. In general, however, sultones (cyclic compounds) are preferred over alkyl alkanesulfonates for use in the present invention.

The sultone or alkyl alkanesulfonate may constitute the entire organic solvent used in the battery, may constitute the major portion (at least 50%) of the organic solvent or may be present as a minor component (under 50%) in an organic solvent mixture. Beneficial results have been observed with as little as 20% sultone (see Examples 12 and 15) and are expected to be seen with as little as 2%, 5% or 10% of sultone or alkyl alkanesulfonate, by weight of total organic solvent. Also, as illustrated in Example 13 and 16, beneficial results occur when sultones are used in at least one cycling of a battery even if the electrolyte containing sultones is removed and a fresh electrolyte containing less or no sultone is later inserted.

Preferred proportions of sultone, by total weight of organic solvent, are about 5–100%, with about 5–25% being more preferred in instances where the sultone is used as an additive to stabilize the solvent against highly reduced polymers, and about 70–100% being more preferred when the sultone is the primary solvent.

Any salt suitable for use in conjugated polymer batteries may be used with the present solvents as battery electrolytes. No salt has yet been identified which is stable in other usable solvents, but unstable in sultones. Furthermore, as indicated in Example 2 below, perchlorates, which are unstable in the presence of polyacetylene reduced to an extent greater than 8% (0.6 V) in many solvents, can be used with sultones in the presence of highly reduced polyacetylene (or other reduced conjugated backbone polymers) under proper circumstances, as determined by routine experimentation based upon the present disclosure. Thus, perchlorate salts can be used in the presence of reduced polyacetylene (as in the discharged battery of Example 2 or in the moderately charged battery of Example 13) when the solvent contains either a minor or major proportion of sultone.

In addition to sultones or alkyl alkanesulfonates and salts, the electrolyte may contain additional ingredients including co-solvents (especially for affecting viscosity, conductivity, and salt solubility), stabilizers and wetting agents. Examples of such other components include propylene carbonate, sulfolane, 3-methyl-2-oxazolidinone, dimethyl sulfoxide (DMSO), dimethyl sulfite, tetrahydrofuran (THF), 2-methyltetrahydrofuran (2-MeTHF), glymes, acetonitrile, benzonitrile, butyronitrile, propionitrile, toluene, benzene, dichloromethane, nitromethane and nitrobenzene.

Several combinations of anode and cathode may be used with the present electrolyte, provided that at least one of the anode or cathode is a conjugated backbone polymer such as polyacetylene, polyphenylene, polyacenediyls, polyacenes, poly(phenylene vinylene), poly(phenylene sulfide), poly(phenylene oxide) polythianthrene, polyaniline, polypyrrole, polythiophene, poly(phenyl-quinoline), substituted versions of the above or other polymer having conjugation along at least one backbone thereof and rendered conductive by electrochemical doping with either cations, anions or both.

In one such combination, both anode and cathode are conjugated backbone polymers. In such event the anode (the negative electrode) is electrochemically inserted with cations (especially alkali metal or tetraalkylammonium cations) during charging. The cathode may either be inserted with cations (i.e., reduced) during discharging or by anions (especially the anion of the salt such as tetrafluoroborate, perchlorate, hexafluoroarsenate, hexafluorophosphate or trifluoromethanesulfonate) during charging (i.e., oxidized).

In a second such combination, the anode is such a reduced polymer inserted by cations (especially alkali metal cations) during charging and the cathode is a transition metal chalcogenide (such as $TiS_2$, $MoO_3$, $V_6O_{13}$ or $LiCoO_2$) intercalated by alkali metal cations (especially $Li^+$) during discharging. Suitable such transition-metal chalcogenides are listed on page 392 of Lithium Batteries (J. P. Gabano, ed., Academic Press, 1983) with those having mid-discharge voltages versus a lithium anode of 2.3 V or greater being preferred. In a third such combination the anode is an alkali metal in zero valence state (such as lithium), an alloy thereof (such as lithium-aluminum) and the cathode is such a conjugated backbone polymer inserted by with anions during charging; e.g., $Li/LiBF_4/PA+$ (where $PA+$ denotes oxidized polyacetylene).

In many cases, and especially when the anion is inserted into the cathode polymer during charging, preferred salts are of the formula MA, where M is preferably Li, Na or K and A is preferably $BF_4$, $PF_6$, $ClO_4$, $AlCl_4$, $FeCl_4$, $AsF_6$, $SbF_6$, $CF_3SO_3$ or $SO_3F$. The salts preferred in the second combination of polymer anode and either transition-metal chalcogenide cathode or reduced polymer cathode include those containing $ClO_4$, $PF_6$, $BF_4$, $CF_3SO_3$, Br and I. In cells with reduced polymer anodes, corresponding salts with tetraalkylammonium cations may also be used.

For many of the above electrode combinations, particular mixtures of sultone or sulfonate with particular co-solvents are preferred or may offer improvements over the use of the co-solvent alone in a similar battery. The first instance would be in a polymer/polymer cell, for which solvents such as propylene carbonate and sulfolane offer utility, but for which they are limited in the degree to which the anode can be reduced before degradation or self-discharge occurs. Sultones have been shown to improve such batteries in the degree of acceptable anode reduction. Similar effects may be obtained with sulfonates mixed with propylene carbonate or sulfolane; and similar effects may be obtained when sultones or sulfonates are mixed with acetonitrile, benzonitrile, butyronitrile, propionitrile, nitromethane, nitroethane, nitrobenzene or dichloromethane or other similar nitriles, nitroalkanes or chloroalkanes. In general, the latter list of nitriles, nitroalkanes or chloroalkanes are sufficiently stable with respect to oxidized polymer, but have not been demonstrated to offer stability to reduced polymer for practical use in a reduced polymer battery.

A second class of batteries in which the present solvent mixtures could be used are those containing reduced polymer electrodes only (e.g. $Li/PA^-$, $PA^-/TiS_2$) for which ethers are known to be useful. The addition of sultones and sulfonates is believed, in at least some instances, to increase the degree to which alkali metal cations can be inserted into the reduced polymer of such batteries without unacceptable degradation or self-discharge. Examples of electrolytes in such cases are sultones mixed with dimethoxymethane, dimethoxyethane, diglyme, THF and 2-methyl THF. In the same type of battery, more conductive solvents such as 3-methyl-2-oxazolidinone generally will not be stable with respect to the substantially reduced polymer. Addition of sultones or sulfonates may increase such stability sufficiently to make such batteries practical. Examples of suitable mixtures in these cases are sultones mixed with 3-methyl-2-oxazolidinone, N-methyl pyrrolidinone, dimethyl sulfoxide, methyl formate, dioxolane and ethyl acetate.

EXAMPLES

Example 1

A battery was constructed in a sealed glass container, consisting of a lithium anode with expanded nickel current collector, polyacetylene (PA) film cathode synthesized by the technique of Shirakawa with a platinum current collector and an electrolyte comprised of 1.0M $LiClO_4$ in 1,4-butane sultone. The battery was cycled three times between 2.5 and 3.8 V such that the polyacetylene became oxidized (p-doped) during charging. The coulombic efficiency increased with each cycle and was 88% for the third cycle. The doping level was 4% per CH unit.

The battery was cycled seven more times between 2.75 and 3.75 volts. The coulombic efficiency on the tenth cycle was 96% corresponding to a 3% per CH unit charge/discharge level.

Example 2

A battery was constructed as outlined in Example 1. This battery was cycled four times between 2.5 and 0.7 V such that polyacetylene became reduced (n-doped) during discharging. The doping level was 3–4%. The coulombic efficiency increased with cycling and was 93% on the fourth cycle. This battery was then cycled three more times between 2.5 and 0.7 V and then cycled three times between 2.5 and 0.2 V with the final cycle between these two limits giving a coulombic efficiency of 99%. This battery was then cycled twice between 1.0 V and 0.2 V with a coulombic efficiency of 93% and a doping level of 8.5% between these voltage limits. The battery was subsequently cycled five times between 1.0 and 0 V vs. Li$^+$/Li with the efficiency of the last cycle being 96%. The battery was then completely recharged at 2.5 V. The charge out corresponded to an equivalent doping level of 40% per CH unit.

The battery was subsequently discharged to an equivalent 30% doping level, stored for thirteen days and completely charged. The charge obtained corresponded to a 90% coulombic efficiency.

Example 3

A battery was constructed as outlined in Example 1. After the first cycle between 0.6 and 2.5 V this battery was cycled between 0.5 and 1.5 V. Every three cycles the lower potential was stepped down 100 mV. The potential limits of the final cycle was 0.3 and 1.5 V. The average efficiency, 9 cycles, was 94% with the average reduction level of the polyacetylene being 8%.

Example 4

A battery was constructed as outlined in Example 1 (including a LiClO$_4$ in butane sultone electrolyte) except that both the anode and cathode were polyacetylene with a lithium reference. The anode and cathode were charged and discharged independently vs. the lithium reference and then cycled as an all polymer battery between 0.7 and 2.5 volts. The doping levels were 4%. The coulombic efficiency improved with cycling and was 86% on the fifth cycle. The battery was then cycled three times between 3.5 and 1.0 V with an average coulombic efficiency of 90%. The cathode was then discharged and the anode was charged vs. the lithium reference to a 5% doping level. The all polymer cell was then cycled between 3.7 and 1.5 V seven times. The average coulombic efficiency was 88%.

Example 5

A lithium anode-polyacetylene cathode battery was constructed as outlined in Example 1 except that the electrolyte was 1.0M LiAsF$_6$ in 1,4-butane sultone. The battery was cycled five times between 3.75 and 2.5 V. The oxidation level was 4% per CH unit. The coulombic efficiency was 97% for the fifth cycle. These results should be compared with those obtained by Shacklette & Elsenbaumer (U.S. Ser. No. 408,376, Example 4) under comparable conditions, except that the solvent was sulfolane, where a coulombic efficiency of 89% was obtained.

To test the stand life, the battery was subsequently charged to a 4% doping level and stored. Discharge after 24 hours to 2.5 V resulted in a coulombic efficiency of 91%.

Example 6

A battery was constructed as outlined in Example 1 except that the electrolyte was 1.0M LiClO$_4$ in 1,3 propane sultone. The battery was cycled between 2.5 and 3.8 V. The coulombic efficiency on the eighth cycle was 95%. The oxidation level was 4% per CH unit.

Example 7

A battery was fabricated as outlined in Example 1 except that the electrolyte was 1,3 propane sultone—1.0M LiClO$_4$. This battery was operated as in Example 2, with the initial cycle between 0.6 and 2.5 V. Subsequent cycles were between 0.8 and 2.5 V. The sixth cycle, a 6.5% reduction level of the polymer, had a coulombic efficiency of 99%.

Example 8

A battery was fabricated as outlined in Example 1 except that both the anode and cathode were polyacetylene with a lithium reference electrode and LiClO$_4$ in propane sultone as the electrolyte. The anode and cathode were initially charged and discharged vs. the lithium reference and then cycled vs. the other between 1.4 and 3 V. The coulombic efficiency on the sixth cycle, a 3% reduction and oxidation level, was 88%.

Example 9

A battery was fabricated as outlined in Example 1 except that the electrolyte was ethyl methanesulfonate—1.0M LiClO$_4$. After the initial cycle the battery was cycled between 2.7 and 3.7 V with the upper potential limit being increased 100 mV every third cycle. The tenth cycle, 2.7 to 3.9 V, gave a coulombic efficiency of 94% corresponding to an oxidation level of 4.6% per CH unit.

Example 10

A cell was assembled in an argon-filled dry box with a lithium anode pressed against a polished nickel plated anvil and a cathode consisting of 30 mg of poly(p-phenylene) combined with an additional 3 mg of acetylene black (Shawinigan ™ Black). The cathode material was pressed into the bottom of a cylindrical goldplated stainless steel container. Anode and cathode were separated by a non-woven glass spacer which was saturated with the electrolyte (1M LiAsF$_6$ in 1,4-butane sultone). The anode and cathode were each ½ inch (1.1 cm) in diameter. The cell was cycled a total of 8 times between about 4.6 V and 2.0 V at different rates up to 1 mA. Coulombic efficiency was low (31%) but improved with cycling (e.g. 81% for the second cycle). The fifth cycle was run at a 200 μA rate (for charge and discharge) and displayed a coulombic efficiency of 78.6%. The capacity demonstrated on discharge was equivalent to an 11.6% oxidation level of the polyphenylene [i.e. a composition change from $[(C_6H_4)^{+0.116}(AsF_6^-)_{0.116}]_x$ to $[C_6H_4]_x^0$. The eighth cycle achieved a capacity equivalent to a 16.8% oxidation level. At this point, the fully discharged cell was disassembled and the components examined. The electrolyte had a brownish discoloration but IR analysis of the polyphenylene indicated no apparent degradation of the polymer (i.e., no crosslinking, sulfonation, fluorination, or other chemical modification). The only apparent effect of cycling on the polymer was a possible increase in chain length as evidenced by a weakening of IR bands attributable to chain ends.

Example 11

A cell was assembled as in Example 10 with a lithium anode, a polyphenylene (PPP) cathode (24.3 mg PPP, 2.4 mg Shawinigan Black) and an electrolyte of one molar $LiClO_4$ in 1,4-butane sultone. The cell was cycled in the range 2.0 V to 0.25 V so that the polyphenylene would be reduced to a composition of the type, $[(C_6H_4)^{-y}Li^+_y]_x$. The cell was cycled twice, the second discharge being equivalent to a change in y; $\Delta y = 0.081$, but with only a fraction of this capacity being recoverable on charge, $\Delta y = 0.026$.

Example 12

A 1.4 cm$^2$ sample of PA grown on carbon felt (CF) weighing 31 mg total (about 12 mg of PA) was attached at one end to a Pt wire, wrapped in glass filter paper and then Li foil counter electrode. A 4:1 mixture of propylene carbonate (PC) and propane sultone (PS) was made 1 molar in $LiClO_4$ and used as the electrolyte. The cell was cycled 3 times between 2.5 V and 0.6 V with capacities (and coulombic efficiencies) of 1.22 mAh (51%), 3.96 mAh (72%) and 3.96 mAh (95%). The capacities per gram of $[(CH)^{-y}Li^+_y]_x$ plus the CF support are 39 mAh/g, 128 mAh/g and 128 mAh/g respectively.

Example 13

A cell was fabricated from 13 mg (1.6 cm$^2$) of polyacetylene (PA) wrapped in Pt gauze, 2.5 cm$^2$ of Li foil, a glass filter paper separator and an electrolyte of 1M $LiClO_4$ in propane sultone (PS). The cell was cycled 3 times to a PA reduction level of 6% and back to neutrality. Approximately half of the PS solution was removed and replaced by dry distilled propylene carbonate (PC). The next three cycles between voltage limits of 2.5 and 0.7 V had coulombic efficiency = 57%, 87% and 95% with the recharge corresponding to PA reducing levels of 3.6%, 11.4% and 12.1%.

Comparative Example 14

A cell comprised of 7 mg of PA (1.4 cm$^2$) wrapped in Pt gauze, 3 cm$^2$ of Li foil counter-electrode, 0.5 mL of 1M $LiClO_4$ in dry propylene carbonate and a glass filter paper separator was cycled between the voltages of 0.4 V and 2.5 V. The capacities (and coulombic efficiencies were 4.1% (55%), 1.2% (25%) and 0.87% (42%).

Example 15

Two samples of PA grown on carbon felt and pressed at 1 ton/cm$^2$ (88 MPa) (each weighing 16 mg with about 8 mg PA) were cycled in separate cells containing Li counter electrodes. One was oxidized to 3.8 V vs Li in one molar $LiClO_4$ in propylene carbonate and then reduced back to its neutral state. The other was reduced to 0.6 V vs Li and oxidized back to its neutral state in one molar $LiClO_4$ in propane sultone. Both electrodes were washed in a fresh 4:1 mixture of propylene carbonate to propane sultone and then assembled together in a cell with one molar $LiClO_4$ in propylene carbonate to propane sultone (4:1). The cell was cycled between 1.4 V and 3.2 V with capacities (and coulombic efficiencies) of a 0.94 mAh/cm$^2$ (96%), 1.01 mAh/cm$^2$ (80%), 1.21 mAh/cm$^2$ (76%), 1.08 mAh/cm$^2$ (75%) and 0.83 mAh/cm$^2$ (88%).

Example 16

A 2 cm$^2$ piece of PA grown on Pt gauze (19.4 mg. of PA) was electrochemically Li$^+$ doped in a cell with one molar $LiClO_4$ in propane sultone using a Li foil counter electrode. The cell was cycled between 0.2 V and 2.5 V with the coulombs passed on recharge equal to 8.9 mAh (coulombic efficiency = 63%) or 22% reduction of PA. The PA electrode was removed, washed with dry THF and placed in a new cell with one molar $LiClO_4$ (THF) as the electrolyte and cycled twice between 0.8 and 2.5 V. The electrolyte was then replaced by fresh $LiClO_4$ (THF) and cycled two more times. After a fourth change of electrolyte and two final cycles between 0.8 and 2.5 V, the PA electrode was rinsed in THF and dried in vacuo. Analysis of the electrode surface by ESCA indicated that it was 8–18% S$^{+6}$, indicating that a sulfur-containing coating had been formed during the initial cycle in propane sultone.

We claim:

1. In a battery comprising an anode, a cathode and an electrolyte, wherein at least one of the anode and cathode comprises a conjugated backbone polymer wherein the electrolyte comprises an organic solvent having dissolved therein a salt, 1ith at least a portion of said salt inserting into said conjugated backbone polymer during the charging or discharging of said battery, the improvement wherein the solvent comprises at least one sultone of the formula:

wherein: R is alkylene having from 2 to about 5 carbon atoms either unsubstituted or substituted with one or more alkoxy or alkyl groups having from 1 to about 4 carbon atoms.

2. The battery of claim 1 wherein R is $(CH_2)_n$ with n being an integer of 2–5.

3. The battery of claim 2 wherein said sultone is propane sultone.

4. The battery of claim 2 wherein said sultone is butane sultone.

5. The battery of claim 1 wherein said salt is an alkali metal salt and said anode comprises a conjugated backbone polymer into which alkali metal cations insert during the charging of said battery.

6. The battery of claim 5 wherein said anode comprises polyacetylene.

7. The battery of claim 6 wherein said cathode is a conjugated backbone polymer.

8. The battery of claim 7 wherein alkali metal cations insert into the conjugated backbone polymer of said cathode during the discharging of said battery.

9. The battery of claim 7 wherein said alkali metal salt contains an anion which inserts into said conjugated backbone of said cathode during the charging of said battery.

10. The battery of claim 9 wherein said salt is of the formula MA, with M being selected from the group consisting of Li, Na, K and tetraalkylammonium and A being selected from the group consisting of $BF_4$, $PF_6$, $ClO_4$, $AlCl_4$, $FeCl_4$, $SbF_6$, $AsF_6$, $CF_3SO_3$ or $SO_3F$.

11. The battery of claim 10 wherein M is Li, Na or K and A is selected from the group consisting of $BF_4$, $PF_6$, $ClO_4$ and $CF_3SO_3$.

12. The battery of claim 6 wherein said cathode is a transition-metal chalcogenide into which alkali metal cations are inserted during the discharging of said battery.

13. The battery of claim 5 wherein said cathode is a conjugated backbone polymer.

14. The battery of claim 5 wherein said cathode is a transition-metal chalcogenide inserted by alkali metal cations during the discharging of said battery.

15. The battery of claim 14 wherein said salt is of the formula MA, with M being selected from the group consisting of Li, Na and K and A being selected from the group consisting of $BF_4$, $PF_6$, $ClO_4$, $CF_3SO_3$, Br and I.

16. The battery of claim 15 wherein M is Li.

17. The battery of claim 1 wherein said anode comprises alkali metal in zero valence state, said salt is an alkali metal salt and said cathode is a conjugated backbone polymer.

18. The battery of claim 17 wherein said alkali metal salt contains anions which insert into said conjugated backbone polymer of said cathode during the charging of said battery.

19. The battery of claim 18 wherein said salt is of the formula MA, with M being selected from the group consisting of Li, Na and K and A being selected from the group consisting of $BF_4$, $PF_6$, $ClO_4$, $AlCl_4$, $FeCl_4$, $AsF_6$, $SbF_6$, $CF_3SO_3$ and $SO_3F$.

* * * * *

UNITED STATES PATENT AND TRADEMARK OFFICE
CERTIFICATE OF CORRECTION

PATENT NO. : 4,528,254

DATED : July 9, 1985

INVENTOR(S) : James F. Wolf et al.

It is certified that error appears in the above-identified patent and that said Letters Patent are hereby corrected as shown below:

Column 8, line 26, "lith" should read -- with --.

Signed and Sealed this

Third Day of December 1985

[SEAL]

Attest:

DONALD J. QUIGG

Attesting Officer

Commissioner of Patents and Trademarks